UNITED STATES PATENT OFFICE.

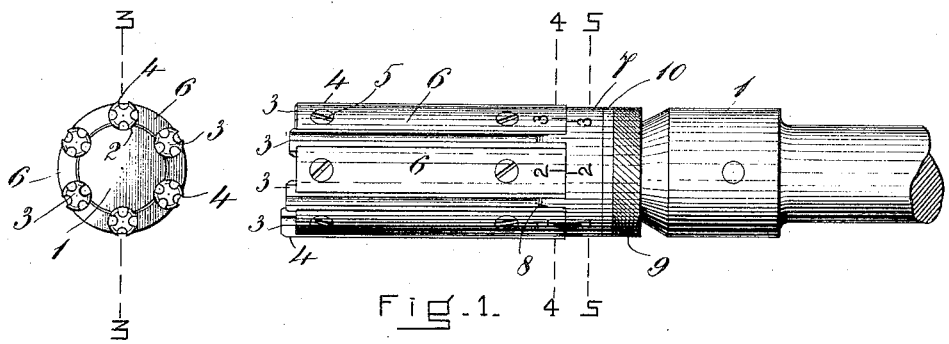
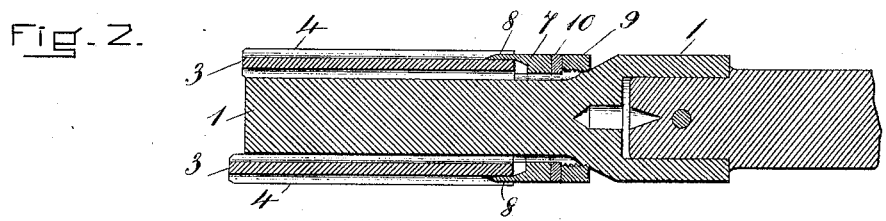
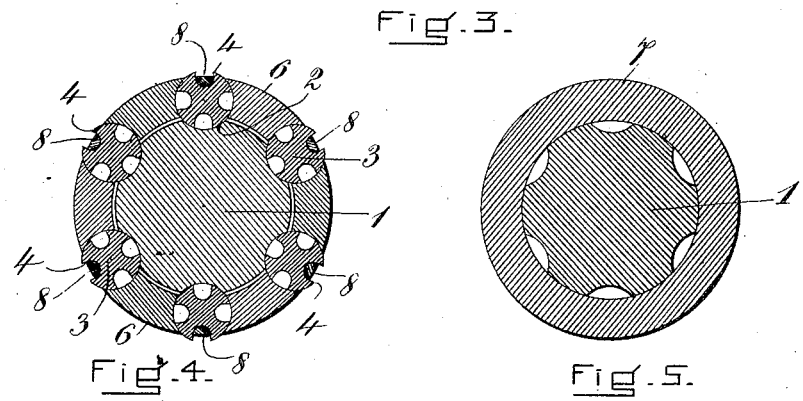
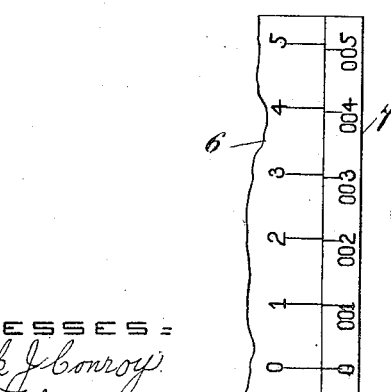
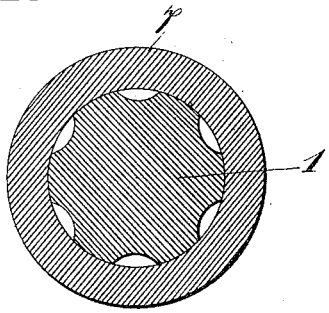
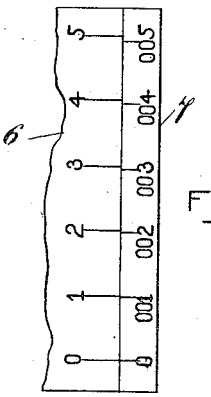
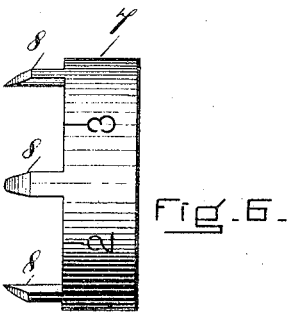

EUGENE HABER, OF BOSTON, MASSACHUSETTS, ASSIGNOR TO MORSE TWIST DRILL & MACHINE COMPANY, OF NEW BEDFORD, MASSACHUSETTS.

REAMER.

No. 909,401.  Specification of Letters Patent.  Patented Jan. 12, 1909.

Application filed June 27, 1907. Serial No. 381,176.

*To all whom it may concern:*

Be it known that I, EUGENE HABER, a citizen of the United States, and a resident of Boston, in the county of Suffolk and State of Massachusetts, have invented a new and useful Improvement in Reamers, of which the following is a specification.

My invention relates to reamers and its objects are to provide a reamer having cutters with a plurality of cutting edges that will always have the desired position along the shank without setting and which may be simultaneously and accurately adjusted.

The drawings which accompany and form a part of this specification illustrate one embodiment of my invention, although it will be understood that I do not limit myself to the particular embodiment therein shown inasmuch as many modifications may be made therein without departing from the principle of my invention.

Figure 1 represents a side view of a reamer constructed in accordance with the present invention. Fig. 2 represents an end view thereof. Fig. 3 is a longitudinal section taken on the line 3 3. Fig. 4 is a cross-section taken on the line 4 4. Fig. 5 is a cross-section taken on the line 5 5. Fig. 6 is an elevation of the adjusting collar, and Fig. 7 is a diagram illustrating the principle of the micrometer scale.

In the figures, 1 represents a shank provided with cutter seats 2, each receiving one of the cutters 3 which preferably are cylindrical in section and each of which is provided with a plurality of cutting edges 4, adjusted as shown, to be eccentric to the axis of rotation of the shank.

The clamps 6 which are secured adjustably by means of screws 5 are provided with concaved side edges which are adapted to fit the convex surfaces of the cutters and thereby clearly hold said cutters in position.

7 is a collar rotatably mounted upon the shank 1, back of the cutters, and having projecting forwardly therefrom pins 8, equal in number to the cutters and having their ends of such a width and in such a position as to fit within that one of the grooves in each cutter, which is furthest out from the center of the shank, and yet lie wholly within or below the cutting edges formed by the sides of said groove. Said pins increase in size vertically downward from their said ends to where they join the collar, whereby they bear against the ends of the cutters and assist the clamps in holding them from longitudinal movement backward when in use.

9 is a lock-nut threaded on the shank 1 to hold the adjusting collar 7 in fixed position, and 10 is a washer interposed between said lock-nut and collar.

When the cutting edges become dull, the clamps 6 may be loosened, and the cutters withdrawn out of contact with the pins 8 and rotated so as to bring fresh cutting edges into working position and the clamps tightened without removing the cutter from the reamer and without having to re-sharpen the dull edges.

Each reamer will be made so that the diameter of the cutting circle, when the micrometer graduations marked zero are in alinement, is of a standard size. To increase this diameter, the clamps 6 are loosened and the adjusting collar 7 turned in crosswise direction in the form shown, so that, for example, when the graduations 1 and .001 are in alinement, the diameter of the cutting circle will be .001 inch greater than the normal diameter. The micrometer graduations are placed respectively as shown in Fig. 1 on the clamps 6 and the collar 7.

I claim:

1. In a reamer, the combination with the shank having a plurality of arc-shaped longitudinal cutter-seats therein, a circular cutter, provided with a plurality of longitudinal grooves, the sides of which form cutting edges, slidably mounted in each of said cutter-seats, removable clamps between each pair of cutters to hold them in adjusted position, and a collar rotatably mounted on the shank back of the cutters and having pins, of a width to fit the grooves in the cutters, projecting therefrom into said grooves, whereby said cutters can all be adjusted simultaneously by loosening said clamps and rotating said collar slightly, or each cutter can be adjusted independently by sliding it outwardly until the pin projecting from the collar is no longer in engagement with the groove in said cutter, and then turning said cutter to bring another of its grooves in alinement with said pin and returning the cutter and finally tightening up the clamps.

2. In a reamer, the combination with the shank having cutter-seats formed therein, of cylindrical cutters, provided with longitudinal grooves, the sides of which form cutting edges, slidably mounted in said seats, a collar rotatably mounted on the shank back of the cutters and having pins projecting therefrom, the front ends of said pins being of a width to fit the grooves in the cutters and the rear portions of said pins bearing against the ends thereof, and clamps between each pair of cutters.

In testimony whereof, I have hereunto subscribed my name this 19th day of June 1907.

EUGENE HABER.

Witnesses:
PATRICK J. CONROY,
GEO. K. WOODWORTH.